United States Patent
Begeja et al.

(10) Patent No.: US 7,933,774 B1
(45) Date of Patent: Apr. 26, 2011

(54) SYSTEM AND METHOD FOR AUTOMATIC GENERATION OF A NATURAL LANGUAGE UNDERSTANDING MODEL

(75) Inventors: Lee Begeja, Gillette, NJ (US); Mazin G. Rahim, Warren, NJ (US); Allen Louis Gorin, Berkeley Heights, NJ (US); Behzad Shahraray, Freehold, NJ (US); David Crawford Gibbon, Lincroft, NJ (US); Zhu Liu, Marlboro, NJ (US); Bernard S. Renger, New Providence, NJ (US); Patrick Guy Haffner, Atlantic Highlands, NJ (US); Harris Drucker, Long Branch, NJ (US); Steven Hart Lewis, Middletown, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1096 days.

(21) Appl. No.: 10/802,812

(22) Filed: Mar. 18, 2004

(51) Int. Cl.
*G10L 15/06* (2006.01)

(52) U.S. Cl. ........ 704/243; 704/244; 704/245; 704/231; 704/256

(58) Field of Classification Search .................. 704/243, 704/232, 245, 244, 231, 256
See application file for complete search history.

(56) References Cited

U.S. PATENT DOCUMENTS

| | | | |
|---|---|---|---|
| 5,860,063 A * | 1/1999 | Gorin et al. | 704/257 |
| 6,173,261 B1 * | 1/2001 | Arai et al. | 704/257 |
| 6,192,110 B1 * | 2/2001 | Abella et al. | 379/88.01 |
| 6,839,671 B2 * | 1/2005 | Attwater et al. | 704/255 |
| 2003/0088421 A1 * | 5/2003 | Maes et al. | 704/270.1 |
| 2003/0091163 A1 * | 5/2003 | Attwater et al. | 379/88.01 |
| 2004/0162724 A1 * | 8/2004 | Hill et al. | 704/231 |

OTHER PUBLICATIONS

L. Begeja, D. Gibbon, Z. Liu, B. Renger, B. Shahraray, "Interactive Machine Learning Techniques for Improving SLU Models," *HLT/NAACL Workshop on Spoken Language Understanding for Conversational Systems*, Boston, MA, May 6, 2004.

* cited by examiner

*Primary Examiner* — Qi Han

(57) ABSTRACT

A system and method is provided for rapidly generating a new spoken dialog application. In one embodiment, a user experience person labels the transcribed data (e.g., 3000 utterances) using a set of interactive tools. The labeled data is then stored in a processed data database. During the labeling process, the user experience person not only groups utterances in various call type categories, but also flags (e.g., 100-200) specific utterances as positive and negative examples for use in an annotation guide. The labeled data in the processed data database can also be used to generate an initial natural language understanding (NLU) model.

12 Claims, 12 Drawing Sheets

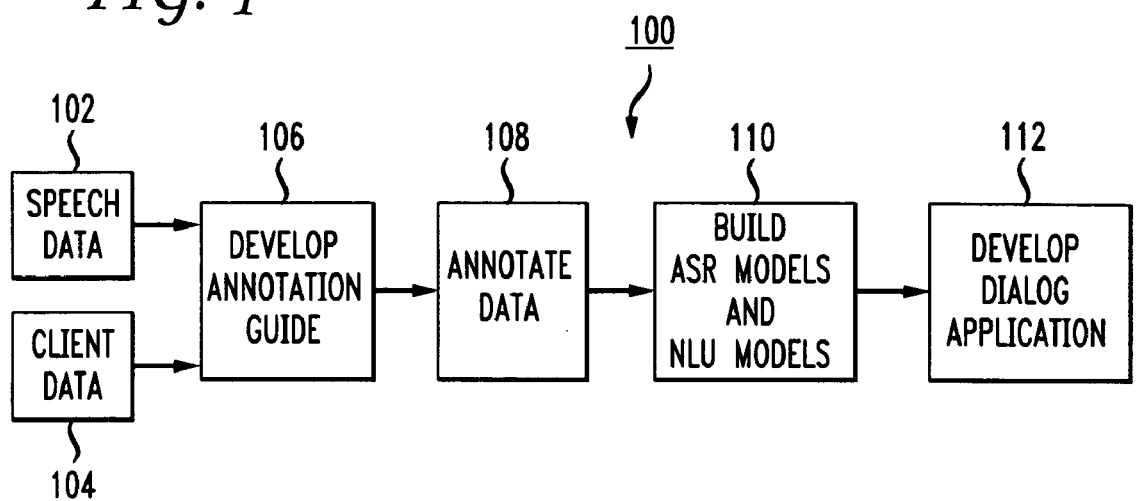
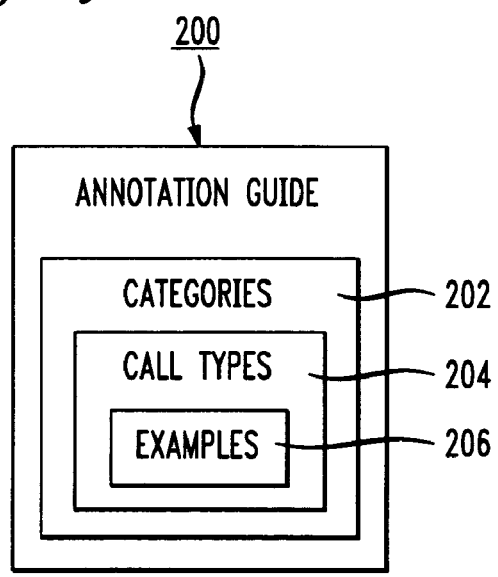

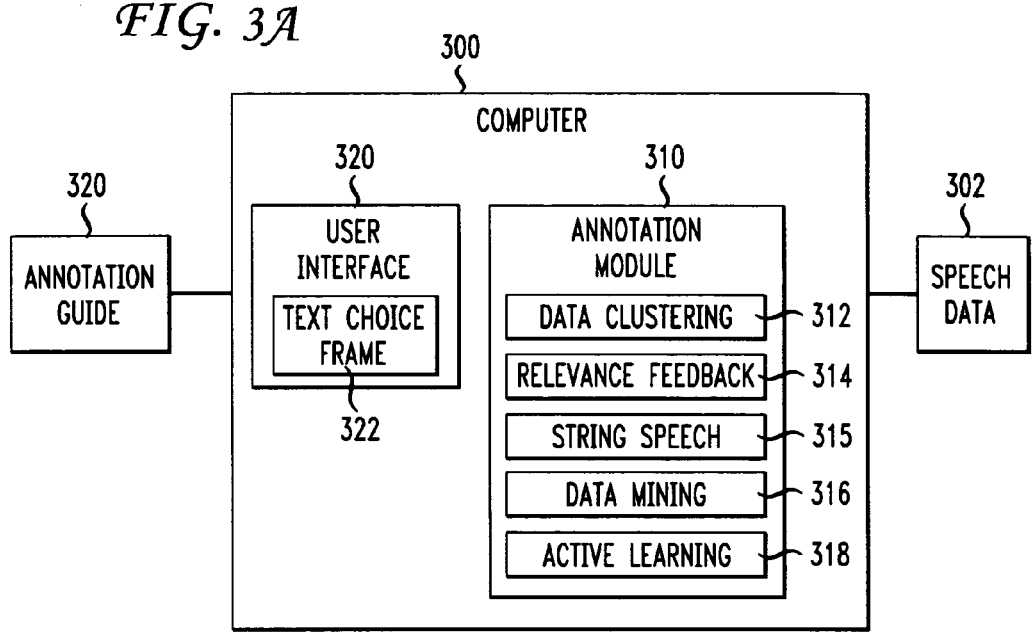
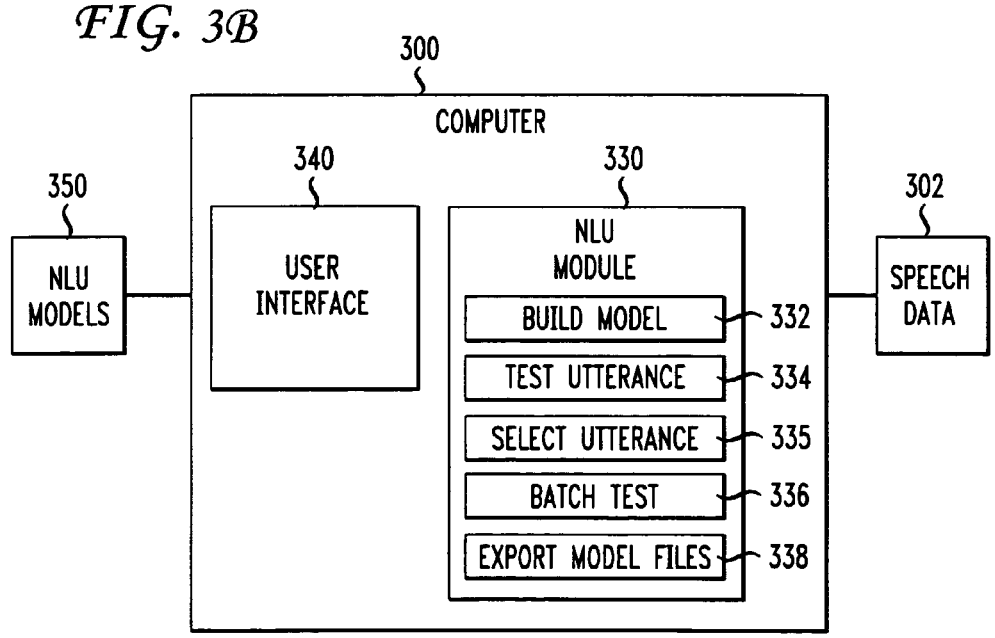

Threshold: 0.3

Number of Committed Classes: 37
Number of Unique IDs: 221
Total Number of IDs including clones: 567

912

| ID | Class | Call Type | Utterance |
|---|---|---|---|
| 3659 | no | Request (Call_Transfer_CSR) | I need to speak with a person in charge of problems |
| 461 | no | Ask(Status_Account)_V | is our account active |
| 784 | yes | Report TroublePlacingCCCall) | I have a calling card that is not working |

Threshold: 0.3

True Call Type(s): Request(Call_Transfer_CSR)
ID: 3659
Utterance: I need to speak with a person in charge of problems

| Call Type | Score |
|---|---|
| Request(Call_Transfer_CSR) | 1 |

FIG. 10A

Threshold: 0.3

Click here to see classification report and overall classification metrics for all the test utterances — 1012
Click here to see NLU Model confidence scores for all the test utterances — 1014
Click here to see NLU Model probabilities for all test utterances — 1016

FIG. 10B

Click here to see summary results

Detailed Results

| Number | Utterance | Truth | Above Threshold | Below Threshold |
|---|---|---|---|---|
| 1 | a person in charge of problems | Request (Call_Transfer_CSR) [1.0000000] | | |
| 2 | is our account active | Ask(Status_Account) [0.999995] | | |
| 3 | i have a calling card that is not working | Report (Trouble_PlacingCCCall) [1.000000] | | |
| 176 | i have two a t and t calling cards i want to know which card to active | Request(Status_CC) [1.000000] | | |
| 177 | um i'm trying to use my calling card pin and it won't work it's um under century twenty one galaxy and uh pin number is three two nine five | Report (Trouble_PlacingCCCALL) [0.999999] | Request (PIN) [1.000000] | Request(Info_International) [0.0000000] Transcription_Indicated [0.0000000] |
| 178 | someone directly on the phone | Request (Call_Transfer_CSR) [1.000000] | | |
| 179 | inquiry about a corporate credit card | Request(Visa)[1.000000] | | |

FIG. 10C

Summary Results

| Class | Number of tests | Overall Score |
|---|---|---|
| Explain(Bill_UnrecognizedNumber) | 0 | |
| Transcription_Indicated | 0 | |
| Request(Info_International) | 13 | 0.846 |
| Ask(Bill_CC)_V | 2 | 1.000 |
| Verify(Payment) | 0 | |
| Request(PIN) | 41 | 0.919 |
| Not(Information) | 2 | 0.000 |
| Request(Order_CC) | 37 | 0.879 |
| Request(Info_Rates) | 5 | 0.420 |
| Ask(Trouble)_V | 5 | 1.000 |
| Request(Rates_CC) | 7 | 0.810 |
| Request(Visa) | 18 | 0.886 |
| Request(Status_CC) | 19 | 0.775 |
| Request(Cancel_CC) | 104 | 0.971 |
| Request(Billing_Other) | 1 | 1.000 |

SYSTEM AND METHOD FOR AUTOMATIC GENERATION OF A NATURAL LANGUAGE UNDERSTANDING MODEL

BACKGROUND

1. Field of the Invention

The present invention relates generally to natural language understanding and, more particularly, to a system and method for automatic generation of a natural language understanding model.

2. Introduction

Dialog applications are often used to automate the process of receiving and responding to customer inquiries. Dialog applications use a combination of voice recognition, language understanding, and text to speech systems to appropriately respond to speech input received from a user or a customer. Billing inquiries, information queries, customer complaints, and general questions are examples of the speech input that is received by dialog applications. The response of the dialog application to a particular speech input depends on the logic of the dialog application.

The development of a successful dialog application, however, is a time consuming process and requires a significant amount of manual labor because of the nature of the tasks being performed. One of the tasks performed in the development of a dialog application is the generation of a natural language understanding (NLU) model. Conventionally, the generation of a NLU model is based on manually labeled utterances, the result of a time-consuming and labor-intensive process. What is needed therefore is a mechanism that enables a reduction in the time to generate an NLU model.

SUMMARY

In accordance with the present invention, a process is provided for rapidly generating a new spoken dialog application. In one embodiment, a user experience person labels the transcribed data (e.g., 3000 utterances) using a set of interactive tools. The labeled data is then stored in a processed data database. During the labeling process, the user experience person not only groups utterances in various call type categories, but also flags (e.g., 100-200) specific utterances as positive and negative examples for use in an annotation guide. The labeled data in the processed data database can also be used to generate an initial natural language understanding (NLU) model.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 illustrates is a block diagram that illustrates an exemplary method for creating a dialog application;

FIG. 2A illustrates an exemplary annotation guide;

FIGS. 3A and 3B illustrate embodiments of an annotation module and a natural language understanding module;

FIGS. 9A and 9B illustrate an embodiment of screenshots that illustrates the select utterance module operation;

FIGS. 10A, 10B, and 10C illustrate an embodiment of screenshots that illustrates the batch test module operation.

DETAILED DESCRIPTION

Figure 2B:
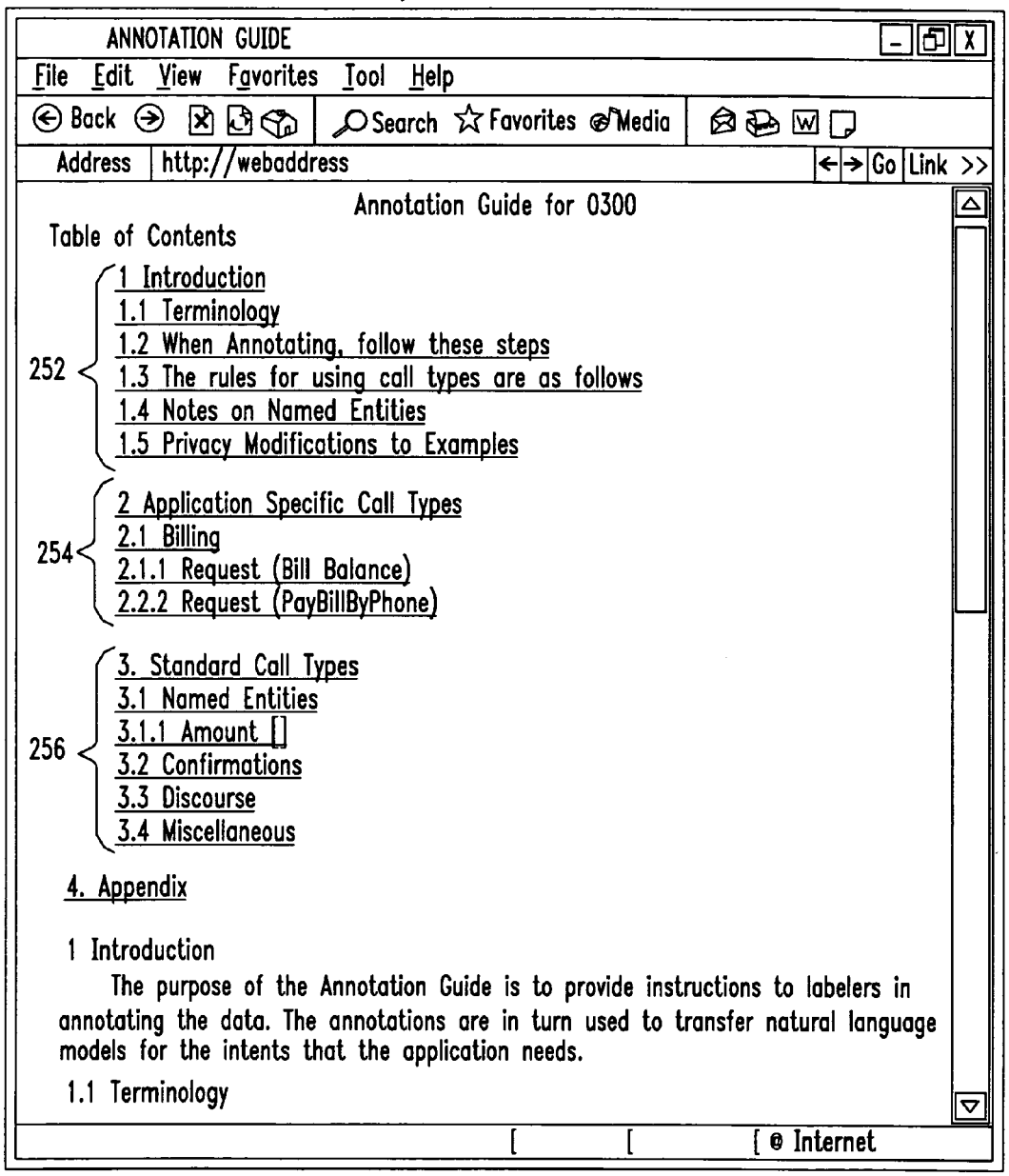
FIG. 2B illustrates the table of contents for one embodiment of an online version of an annotation guide.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

As noted, the development of a successful dialog application, is a time consuming process. One of the tasks performed in the development of a dialog application is the generation of an annotation guide that is used to annotate or label transcribed speech data. The annotation guide is generally created by a user experience person (or other user) who is familiar with the purposes and goals of the dialog application. Becoming familiar with the purposes and goals of the dialog application is also a labor-intensive process.

The annotation guide aids the development of a dialog application because the annotation guide is used by labelers to classify the transcribed speech data within the call types defined by the user experience person. The annotation guide helps ensure that different labelers classify similar utterances within the same call type.

The ability to properly classify the transcribed speech data ultimately has a significant impact on whether the dialog application can respond to speech input appropriately. An annotation guide that does not sufficiently define the call types introduces potential errors into the dialog application because the speech data may be labeled incorrectly by the labelers. If incorrectly labeled or annotated speech data is used to train portions of the dialog application such as the natural language understanding modules, the dialog application will clearly not function properly and will frustrate customers. Thus, the development of a quality annotation guide is important to the development of a quality dialog application.

A labeler uses the annotation guide to determine whether a particular utterance should be labeled with a particular call type. For example, an annotation guide may describe a Request(Pay_Bill) call type used to label utterances that suggest the customer wants to pay his or her bill. The following utterances from transcribed speech data, for example, should be labeled with the Request(Pay_Bill) call type:

I want to pay a bill; and

I got mail and I have my credit card ready.

A poorly developed annotation guide may not provide sufficient guidance to a labeler to properly annotate the second example of "I got mail and I have my credit card ready." Without the guidance of the annotation guide, different labelers may assign different call types to this example. For these reasons, it is desirable to have a well developed and thought out annotation guide to assist in the annotation of the speech data.

FIG. 1 illustrates an example of a conventional process that is used to develop a dialog application. The development of a dialog application often begins with the collection and transcription of speech data 102. Speech data 102 corresponds to transcribed utterances that are likely to be experienced by the dialog application.

In addition to speech data 102, it is useful to collect client data 104 as well. Collecting client data 104 includes obtaining an understanding of the business that desires a dialog application and ascertaining the purpose and goals that the dialog application should achieve. Collecting client data 104 is labor intensive and it is advantageous to work closely with the business to fully understand what the business wants to automate in the dialog application. The user experience person is often involved in the collection of client data 104. The categories and call types that are ultimately included in an annotation guide are often derived by the user experience person from client data 104 and speech data 102.

After client data 104 and speech data 102 are collected, an annotation guide is developed, at step 106, by a user experience person or other user. The annotation guide is used by labelers to annotate speech data 102. Often, the development of the annotation guide can occur concurrently with the collection and transcription of the speech data. When the annotation guide is complete, the speech data is annotated at step 108. Next, automatic speech recognition (ASR) models and natural language understanding (NLU) models are constructed and trained, at step 110, using the annotated speech data as well as the raw speech data. Finally, the dialog application is developed, at step 112, and prepared for testing and/or use by the business.

FIG. 2A is a block diagram that illustrates an exemplary annotation guide that is used to annotate a corpus of speech data. Annotation guide 200 is often a text or word processing file, paper document, spreadsheet, or electronic document that is used as a reference for classifying utterances.

To help label the speech data, annotation guide 200 includes categories 202, which are often divided into multiple call types 204. Each call type usually includes positive examples of utterances that belong in a particular call type as well as negative examples of utterances that do not belong in a particular call type. The call types 204 may also be referred to herein as classes. Annotation guide 200 is typically used in the annotation of speech data that corresponds to telephone calls or utterances received over the telephone. However, the annotation guide may also be used to label utterances that were not telephone calls. The annotation guide can be used to classify electronic messages such as chat and email. In other words, the annotation guide can be used to classify audio, text, transcribed speech, and the like.

For example, a business that is involved with prescription drugs may receive customer inquiries relating to prescription orders, billing questions, and the like. The client data includes information about the prescription drug business and helps identify what the business wants to automate in a dialog application. An annotation guide for this business includes several categories of call types that are related to the types of calls received by the business. One category of call types may be a service category that is related to inquiries about prescription orders or plan details. Another category of call types may be a billing category that is related to customer inquiries about billing, payment, or costs. One of skill in the art can appreciate that an annotation guide can describe multiple categories and call types and each annotation guide is not required to have the same categories or call types.

The call types, in one embodiment, are often generally represented as: Verb(Object). Exemplary verbs include, but are not limited to: Ask, Cancel, Change, Combine, Request, Report, Explain, Verify, and the like. The object relates to a specific call type. The selection or choices of verbs and objects is often specific to a particular business and to the goals that the dialog application is intended to achieve.

Using this format to represent call types 204, the service category may include an Ask(Info) call type, an Ask(Insurance) call type, a Cancel(Miscellaneous Order) call type, and the like. One of skill in the art can appreciate that a large number of different categories and call types can be defined and created by a user experience person.

In each call type, annotation guide 200 can include examples 206. Positive examples are utterances that are clearly in the given call type. Negative examples are utterances that are clearly not in the given call type. For instance, the Change(Credit_Card) call type, which may be in the billing category, may include the following positive examples:

yes I need to change the credit card number in my account uh I have credit cards on my plan and I want to remove them The Change(Credit_Card) call type may also include the following negative examples:

I just received a bill and I though you were supposed to charge the amount on my card (Use Verify(Credit_Card) call type)

Using the annotation guide, a labeler labels other positive utterances in the speech data that are like these examples as being of a particular call type. The negative examples will prevent the labeler from incorrectly labeling utterances in this given call type. The particular call type for the negative utterance may be identified as illustrated above (Verify(Credit_Card)).

FIG. 2B illustrates a Table of Contents for an exemplary annotation guide. In this example, table of contents 250 includes introduction section 252 that references terminology, annotation instructions, and the like of the annotation guide. Section 254 references categories and call types that are specific to a particular dialog application. Section 256 references categories and call types that can be standard across multiple dialog applications.

The following example further illustrates an example of a call type that might be described in an annotation guide. This example illustrates the specific call type Ask(Info) in the service category and provides information that permits labelers to appropriately label utterances such that a natural language model can be trained to respond to this call type. This example illustrates both a category and one call type within the category. The Ask( )call types are used for vague or very general, non-specific questions or requests.

Ask(Info)—Vague

The vague label for callers asking for information, without stating the specific information they want.

Use Ask(Info) Examples:
          1. yes I have a problem
          2. I need information
          3. I have a question
        Do NOT use Ask(Info) Examples:
          1. I need an address (Use Request(MailingAddress))
          2. What do I do with my prescription Using the annotation guide, a labeler annotates speech data and assigns at least one call type to each utterance in the speech data.

FIG. 3A illustrates an annotation module that reduces the time required to label utterances and can be used to interactively or automatically generate an annotation guide. Annotation module 310 is loaded on computer 300 or can be accessed remotely over a network. Computer 300 in this example represents a variety of different computing configurations through which an annotation guide may be developed and generated. Computer 300, for example, may represent a network of computers or a single computer that has access to the annotation module and other resources such as the Internet, spreadsheets, and other files. Annotation module 310 may be used in conjunction with other modules or programs to facilitate accessing the relevant data. For example, annotation module 310 may be used within a browser to access data over a network connection.

As illustrated in FIG. 3B, computer 300 can also include NLU module 330. In general, NLU module 330 can be used to build a NLU model 350 based on utterance information generated by annotation module 310. NLU module 330 can also be used to test the NLU model that has been built. As illustrated, NLU module 330 includes Build Model module 332, Test Utterance module 334, Select Utterance module 335, Batch Test module 336 and Export Model Files module 338. The functions of these modules will be described in greater detail below. Like annotation module 310, NLU module 330 may also be used within a browser to access data over a network connection.

FIGS. 3A and 3B also illustrate that computer 300 generates user interface 320 and 340, respectively. User interface 320 also includes text choice frame 322 through which the utterances identified by annotation module 310 are displayed to the user experience person. Through user interface 320 and 340, respectively, a user experience person provides input that is used to further define the call types. For example, a user experience person can provide input that selects utterances to be included in a particular call type. The input provided by a user experience person through user interface 320 is described in more detail with regard to FIGS. 5, 6, and 7. Examples of user interfaces included within user interface 340 of FIG. B are described in more detail with regard to FIGS. 8A, 8B, 9A, 9B, 10A, and 10B.

Annotation module 310 provides multiple data analyzing functions that help the user identify and define categories, call types, and examples of call types. In one embodiment, annotation module 310 provides interactive tools to create and define call types. The tools can use supervised learning and/or unsupervised learning techniques.

Data clustering module 312 is a module that accesses the speech data and organizes the speech data into N groups of clusters, where N is typically selected by the user. The clustering algorithm uses word distance measures to form the N clusters. Each cluster is associated with a value that indicates the consistency of each cluster. A user can then select a cluster and the utterances in that cluster are presented to the user. The user can easily select specific utterances or reject specific utterances for a particular call type. One of skill in the art can appreciate that data clustering module 312 can also cluster the speech data using N-grams, distances between groups of words, phrases, named entities, and the like. Generally, data clustering module 312 generates clusters of utterances that are related.

Relevance feedback module 314, in one embodiment, is used by annotation module 310 to help find a larger group of utterances of a specific call type using utterances identified by a user and is an example of supervised learning in one embodiment. For example, the user can identify specific utterances as being of a particular call type and relevance feedback module 314 can access speech data 302 and find similar utterances. Alternatively, relevance feedback module 314 can also be used to exclude utterances from a call type. More generally, relevance feedback module 314 is able to examine actions taken by the user to better define a particular call type.

For example, a user experience person may review a group of utterances and identify for each call type both positive utterances and/or negative utterances from that group of utterances. Relevance feedback module 314 may use support vector machines to classify the positive utterances and/or negative utterances. Using the support vector machines, other utterances in the speech data can be ranked or assigned a probability. Relevance feedback module 314 returns the utterances that have the highest probability according to the support vector machines or other classifier. Relevance feedback module 314 can be used iteratively to further refine the utterances that are included in a particular call type. In one embodiment, relevance feedback module 314 is used iteratively until the utterances identified by relevance feedback module 314 are consistent. Relevance feedback module 314 converges on the most relevant utterances in the speech data for a particular category or call type.

The string search module 315 is a module that permits the user experience person to find utterances in the speech data 302 using a string or a string variant. For example, the user experience person may want to find all utterances that include the string "credit card" and the string search module is used to find utterances in the speech data 302 that satisfy the string. The string search module 315 can also be used to search for synonyms, string variants, and the like. The utterances found by the string search module 315 are presented to the user.

Data mining module 316 is another module that is used to find and categorize utterances in the speech data using various data mining techniques. Data mining module 316 uses methods that return an interesting group of utterances. Data mining module 316, or other modules, can utilize the metadata associated with the speech data, synonyms, query expansion methods, or other speech related parameters. For example, data mining module 316 may return each utterance that was the first utterance of a conversation. Alternatively, data mining module 316 may return the longest utterance of a particular conversation. In addition, data mining module 316 can use decision trees, neural networks, and the like or any combination thereof to find an interesting group of utterances in the speech data.

Active learning module 318 can track the actions of the user experience person to help formulate the call types as well as help in the development of future annotation guides and dialog applications. In addition, active learning module 318 can be used to classify utterances that are difficult to place in a particular call type. For example, a user may select exemplary utterances (both positive and negative) of a particular call type. Active learning module 318 can construct a classifier using the exemplary utterances and then rank the utterances in the speech data using the classifier. Active learning module 318 can use support vector machines for this purpose as previously described. Active learning module 318 selects utterances that are not clearly included or excluded from a particular call type. In other words, the active learning module 318 selects marginal utterances and the marginal utterances are then presented to the user experience person. The user experience person can then make a determination as to whether the marginal utterances should or should not be in a particular call type. Active learning module 318 can also be used iteratively.

Annotation module 310 uses various modules to find additional utterances that are like a particular set of utterances or to exclude some utterances from being included in a particular set of utterances. Annotation module 310 is not limited to these modules, but may use other modules and methods for analyzing, organizing and displaying speech data 302.

Generating an annotation guide typically begins when speech data 302 is examined by annotation module 310. Annotation module 310 analyzes speech data 302 using various modules previously described. Annotation module 310, for example, analyzes speech data 302 such that speech data 302 is organized in a particular way. For example, speech data 302 is analyzed using data clustering, string searches, data mining, and the like or any combination thereof. After the data is analyzed, the user is typically presented with a group of utterances. The user provides input to select some of the utterances from the presented group of utterances. The utterances selected in this manner are then used as feedback by relevance feedback module 324 to find additional utterances that are similar to the selected utterances. When the class the user is working on is completed, the class is typically committed.

The creation of a call type often starts by retrieving a group of utterances from the speech data. For example, a user may retrieve all utterances that contain a particular string or that are in a particular cluster. The user can then select specific utterances from the retrieved utterances that are appropriate for the call type that is being created. The call type can be further defined as previously described using the annotation module.

Figure 4:
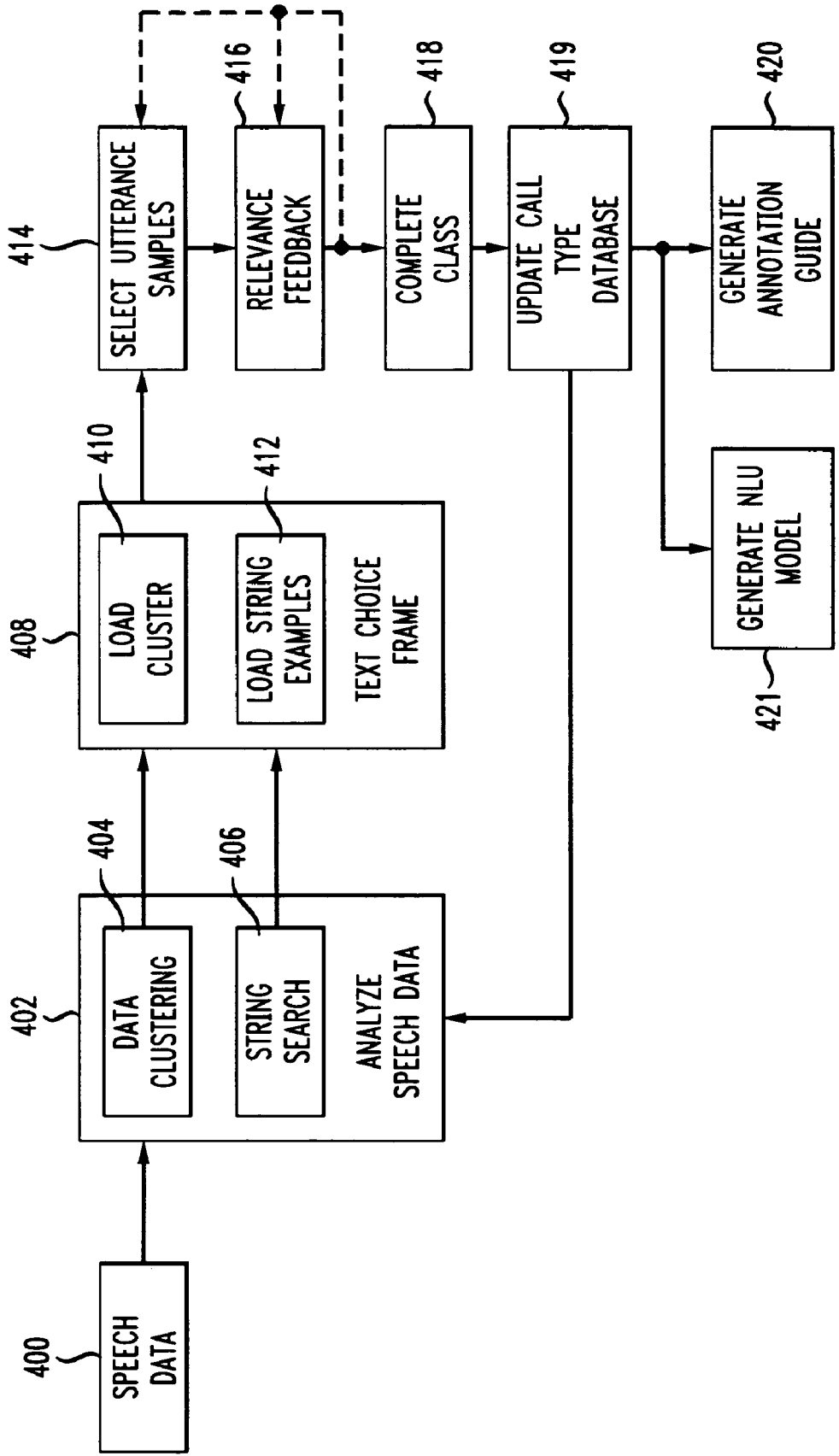
FIG. 4 illustrates one embodiment of a method for generating an annotation guide or natural language understanding model using one or more data organization modules to analyze the speech data.

FIG. 4 is a block diagram that illustrates one example of the generation of an exemplary annotation guide for speech data or a natural language understanding model. The process begins by analyzing speech data 400. In this example, speech data 400 is organized using data clustering 404 or using a string search 406, although speech data 400 can be analyzed or organized using the any of the modules illustrated in FIG. 3A. As previously mentioned, data clustering 404 organizes speech data 400 into N clusters, where N is often specified by a user, although the number of clusters can be determined by default or automatically based on the speech data.

The clusters are visually displayed to the user via a bar chart in one example. Clusters are typically ordered such that the most consistent cluster is, for example, displayed first. Selecting a particular cluster loads the selected cluster or group of utterances into a text choice frame 408 and the text of the utterances is displayed to the user experience person.

String search 406 searches speech data 400 for utterances that include a particular string or string variant. The text of the utterances found by string search 406 is displayed in text choice frame 408. In one embodiment, speech data 400 can be initially analyzed using data mining or active learning, for example.

In another embodiment, the text of selected or random utterances is simply displayed to the user experience person. In other words, the speech data is not initially analyzed. Rather, a group of utterances is simply retrieved from the speech data. The user experience person can simply begin to identify the utterances that belong in a particular call type from the group of retrieved utterances. In this case, the initial utterances selected by the user experience person may be used to seed a search or serve as the basis by which other utterances are chosen from the speech data. Relevance feedback, for example, can locate a larger group of utterances that are similar to the utterances selected by the user experience person.

After the speech data is organized and loaded into text choice frame 408, a user is able to select utterance samples 414 as previously described. Relevance feedback 416 can use the positive and negative utterances that were selected by the user to identify other utterances that should be in a particular call type. The selection of utterance samples and relevance feedback can be performed iteratively until the annotation module selects utterances that are consistently in a call type. In addition, some utterances may be included in more than one call type.

Next, the user can complete or commit a particular class 418 and update the call type database 419. At this point, the user can begin organizing 402 speech data 400 again to generate another call type of speech data. The user can also write a description of the class and of the call types in each class that is associated with the completed class. In one embodiment, the user experience person works on the speech data 400 in defining various call types. In one embodiment, there are four kinds of utterances (positive sample, negative sample, positive example, and negative example). For each call type, there are positive and negative samples. Some of these samples can also be flagged as examples. After all the classes are complete, the annotation module can generate annotation guide 420 from the positive and negative examples. It should be noted that examples are a subset of the samples and that the collection of positive samples (including positive examples) can be used by the NLU module to build an initial NLU model 421. Alternatively, the NLU module can generate an initial NLU model 421.

Figure 5:
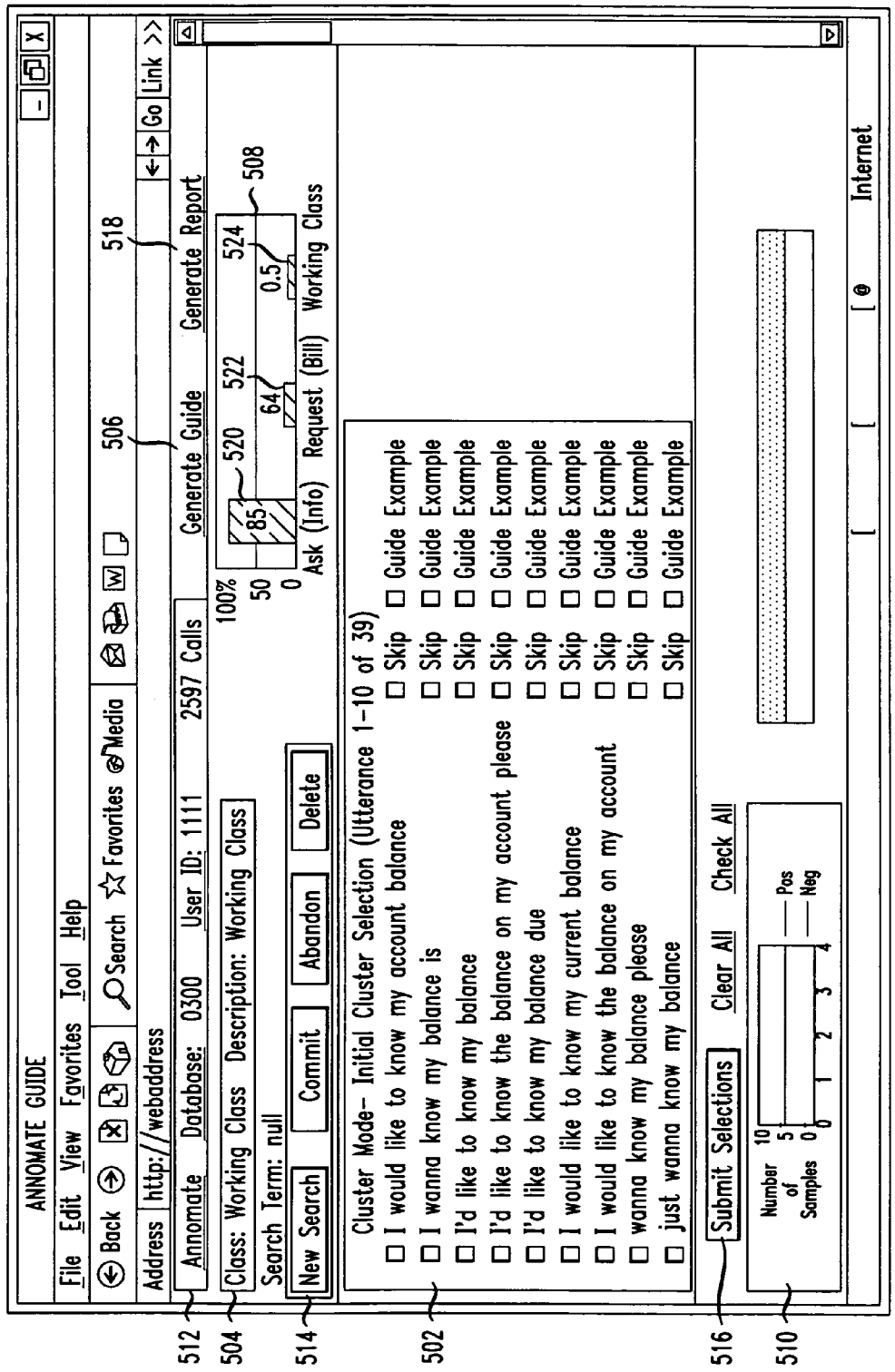
FIG. 5 illustrates an embodiment of a screen shot that illustrates the generation of call types.

FIG. 5 is an example of a screen shot illustrating aspects of automatically generating call types. The screen shot of FIG. 5 illustrates identifying data 512 that describes the speech database being used, the number of utterances or calls in the database, and an identifier. The user has preliminarily provided identifying information 504 that includes a working class and a description of the working class.

In this example, the user has organized the speech data using data clustering, as illustrated by bar chart 508. Bar chart 508 includes bars 520, 522, and 524. Bar 520 and bar 522 represent existing call types while bar 524 represents the working call type. Text 502 of utterances in the cluster selected by the user is displayed in this example. Text 502 can correspond to an existing call type that is being edited or refined or to a working call type.

If the user experience person is developing a new class, FIG. 5 illustrates that the user can select which utterances should be in the working class as well as which utterances should be included as examples in the annotation guide using the checkboxes that are arranged by the displayed utterances. If the guide example checkbox is checked but the utterance is not selected for the working class, then that utterance is included in the annotation guide as a negative example.

Using button 516, a user can submit the selected selections to the working class. Button 516 can also activate the relevance feedback such that a group of utterances that are similar to the utterances identified by the user are presented to the user. When a class is complete, the class is committed along with the class description using the commit button in 514 and the user can begin working on a new class. Generate guide button 506 will automatically create the annotation guide from the positive and negative example utterances of the call type data. Generate report button 518 typically generates a report relating to the call type data. For example, generate report button 518 may cause a window to be displayed that contains the reports that can be generated. Exemplary reports include, but are not limited to, the current status of the working class, a list of the utterances included in the working class, a preliminary annotation guide, and the like.

As previously indicated, the user can analyze or organize the speech data in various manners and the text of selected utterances is displayed to the user. If the user clicks on the text of an utterance, the audio file associated with the text may be played for the user. Control buttons 514 provide other controls for the class being developed. The new search button, for example, may be used to search for utterances for a new call type using a particular string or string variant. The commit button may commit a particular class and automatically begin a new class. The abandon button may be used to start a new class without committing the current class. The delete button may be used to delete a particular class. One of skill in the art can appreciate that other buttons can be included that perform other functions that have been described herein.

Figure 6:
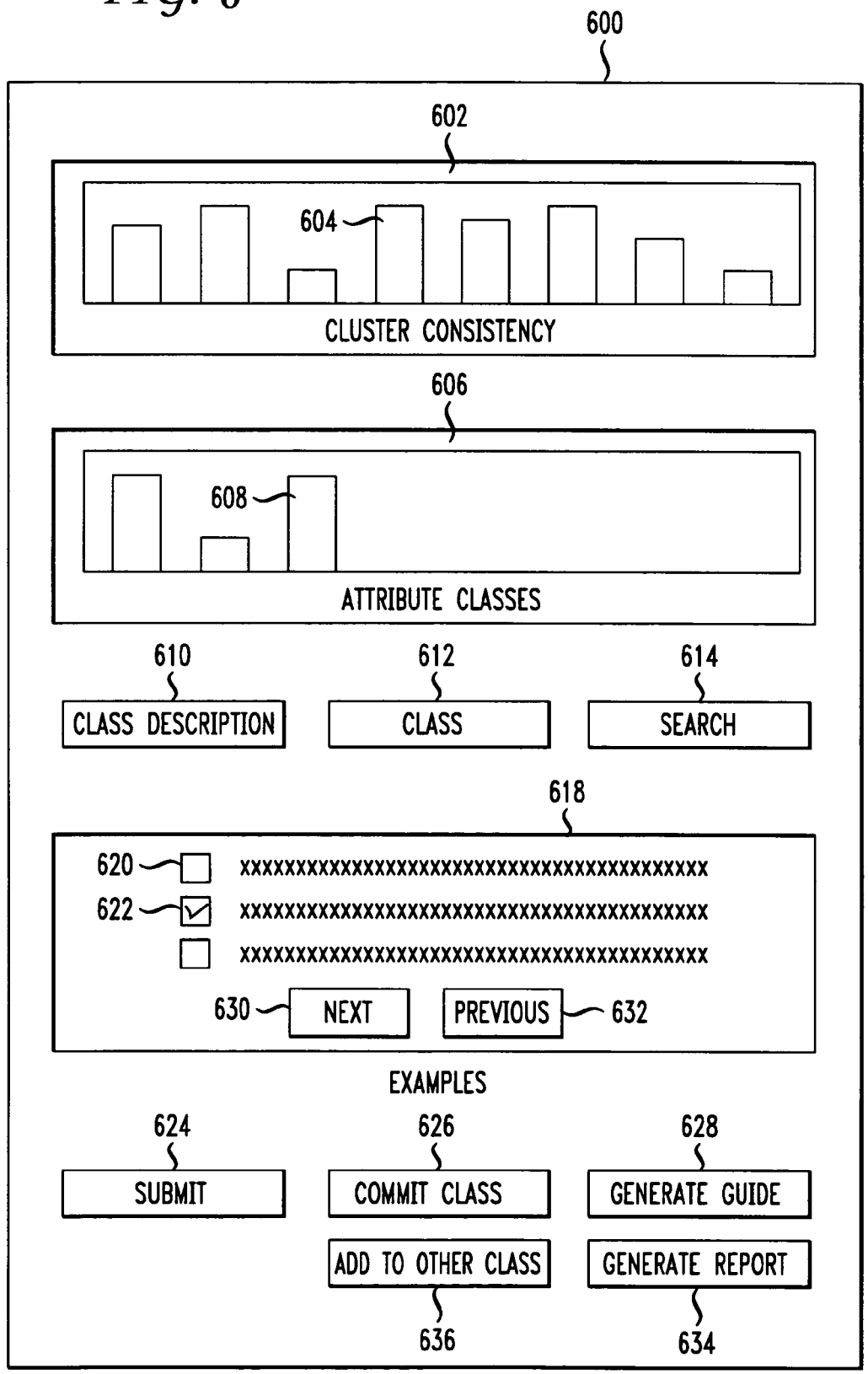
FIG. 6 is another embodiment of a screen shot that illustrates the generation of call types.

FIG. 6 is another example of a user interface that is used to generate classes. In this example, N clusters are displayed in cluster box 602 and the attribute classes being worked on or that have already been created are displayed in class box 606. By selecting, for example, class 608, a user can continue to refine the selected class. Alternatively, a user can begin a new class as previously described.

Class description button 610 enables the user to enter a description of the class that is currently loaded. Class button 612 is used to enter the class name. Search button 614 lets the user enter search terms to organize the speech data. As previously stated, one of skill in the art can appreciate that other buttons similar to search button 614 can be included and used to activate other modules that search, analyze, and/or organize the speech data to return an interesting collection of utterances.

Text entry box 618 contains exemplary utterances that are displayed to the user experience person. In this example, utterance 622 is selected and is a positive utterance and should be included in the current working class while utterance 620 is not selected and is a negative utterance and should not be included in the current working class. Because a particular group of utterances may include more utterances than can be displayed on the screen, additional utterances in the group can be viewed by clicking next button 630 or previous button 632.

When a class is completed, the user selects commit class button 626. If the user experience person has not previously entered a name for the working class or has not provided a description of the working class, the user experience person is prompted to provide such. Submit button 624 uses, in one example, the selected utterances as relevant feedback to select a better or more focused group of utterances for the current working class. By using relevance feedback iteratively, the annotation module provides consistent results for a particular class as previously described. After all the classes are finished and committed, generate guide button 628 generates the annotation guide. The annotation guide is usually represented as a text document, but can be represented in other forms including XML and spreadsheets.

Screen shot 600 also illustrates generate report button 634 that can generate reports as previously described. The reports may take the form of a text document, a spreadsheet, or any other useful representation including XML. Add to other class button 636 is used to place utterances that are selected in text entry box 618 into another class. For example, a box containing a current list of committed classes may be displayed and the user experience person selects the appropriate class for the selected utterances.

The user interface may also provide useful data about the speech data to assist the user experience person in developing the annotation guide. For example, the call types can be compared to determine if there is overlap between the various call types. Word distance, for example, can be used to determine if the overlap exists. If the call types overlap, the overlapping call types can be further refined as described herein.

Also, the user interface may also display how many utterances are in a particular class as well as how many utterances are not classified. This helps ensure, in one embodiment, that marginal examples can be included as examples in a particular class. For example, "I have my mail and I have my wallet" is an utterance that should be classified as a Payment call type. This is a marginal example that is difficult to classify.

The user interface may also include a variety of different input mechanisms. For example, each utterance may be associated with multiple checkbox entries that perform particular functions. One checkbox may be used to include the utterance as an example, another checkbox may be used to exclude the utterance from the annotation guide. Another checkbox may be checked such that the checked utterance is used to seed a new search of the speech data.

In this manner, a user experience person can refine a call type more quickly than by manual examination of the speech data. In addition, the annotation guide can be generated automatically and easily improved if necessary. A new call type, for example, can quickly be added or an existing call type can be expanded or can become more narrow in scope using the present invention.

The present invention also enables a user experience person to work with more than one cluster or call type at the same time. This is particularly useful when two clusters, for example, are related. The ability to work with more than one cluster or call type at the same time also permits the user experience person to develop call types more quickly as utterances can quickly be moved from one cluster to another cluster or call type. Also, relevance feedback can be used to further refine a cluster or call type after an utterance is moved from one cluster or call type to another.

Figure 7:
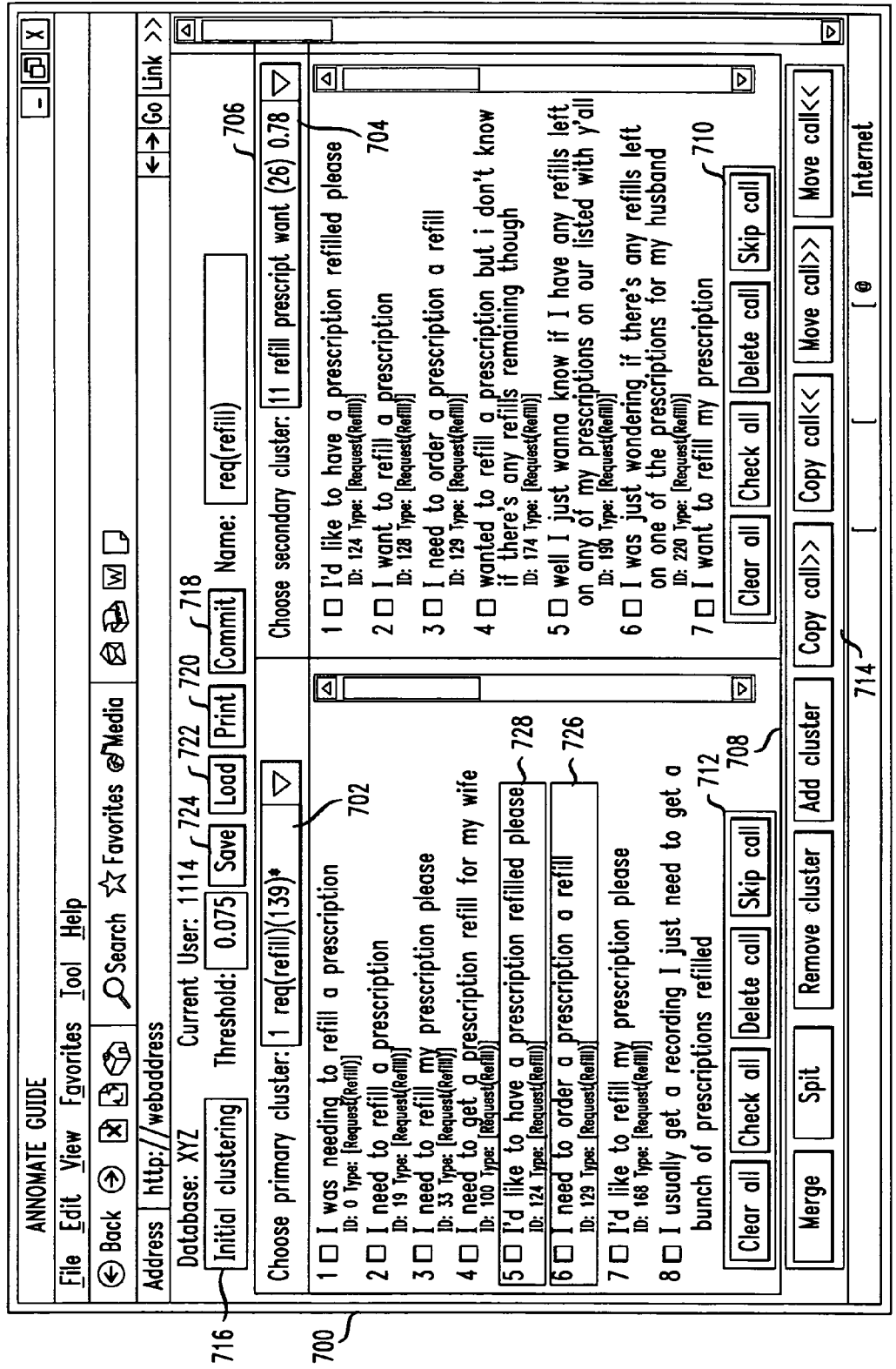
FIG. 7 illustrates another embodiment of a screen shot that illustrates the generation of call types.

FIG. 7 is another illustration of a screen shot that is used to work with more than call type at the same time. In FIG. 7, menu 702 can be used to select one cluster or call type while menu 704 is used to select a second cluster or call type. Thus, box 708 contains utterances from one cluster or call type while box 706 contains utterances from another cluster or call type. In one example, the clusters in menu 702 are sorted by size and the clusters in menu 704 are sorted by their distance from the cluster selected from menu 702. This enables the user experience person to work with related clusters or call types. One advantage provided by this example is that the user experience person can then begin to provide examples that distinguish between related call types or clusters. In other words, marginal utterances that could arguably belong in either cluster or call type can be specifically placed in a particular cluster or call type by the user experience person.

Within each cluster, the user can use the checkboxes to select certain utterances. Control buttons 712 and 710 then permit the user experience person to delete the selected utterances from the cluster, skip the selected utterances, and the like. Control buttons 714 permit the user experience person to move or copy selected utterances from one cluster or call type to another cluster or call type. The clusters can also be merged into a single cluster or the selected utterances in one cluster can be split into another cluster. The call type names and descriptions can be provided or edited as needed. When a user experience person is satisfied, the clusters can be committed using commit button 718. Screen shot 700 also illustrates that the user experience person can use save button 724 to save the work space. Load button 722 permits a saved work space to be loaded.

As has been described, annotation module 310 can be used to efficiently generate call types. As illustrated in the conventional dialog application creation process of FIG. 1, an initial NLU model would only be built after annotated data is generated. This annotation process can extend over a significant period of time (e.g., 2-3 weeks) as human labelers annotate speech data using the annotation guide.

It is a feature of the present invention that the manual data annotation process can be removed from the critical path in building a usable initial NLU model for field testing. In other words, the creation of a usable initial NLU model is not dependent on the results of a manual labeling process. In this new dialog application process, an initial NLU model would be generated from the annotated utterances generated through the interaction of a user experience person with annotation module 310 and text choice frame 322. To illustrate this new dialog application process, reference is made to the system diagram of FIG. 11.

As illustrated, the process begins with the collection of transcribed utterances in database 1110. These transcribed utterances are then processed using processing element 1120, which performs various data reduction steps to prevent the user experience person from seeing redundant utterances. In one embodiment, this includes grouping almost identical utterances into clone families. The processed data is then stored in processed data database 1130.

Next, the user experience person uses Web application 1140 to label the initial set (e.g., 3000) of utterances. In one embodiment, the user experience person works on the processed data in defining various call types. In one embodiment, there are four kinds of utterances (positive sample, negative sample, positive example, and negative example). For each call type, there are positive and negative samples. Some of these samples can also be flagged as examples. The positive and negative examples would then be used to generate annotation guide 1160. It should be noted that examples are a subset of the samples and that the collection of positive samples (including positive examples) can be used to build NLU models 1150.

The user experience person can generate annotation guide 1160 or NLU model 1150 at any point from the data in processed data database 1130. It is a feature of the present invention that the user experience person can use the NLU module (also part of Web application 1140) to build an initial NLU model and to test utterances and fine time the utterances in the call types (thus, modifying the processed data). For example, through the testing process, the user experience person may find incorrect utterances in certain call types and can then remove them or shift them to other call types.

After the user experience person is comfortable with the call types (after iteratively using the NLU testing tools), annotation guide 1160 can then be generated. Annotation guide 1160 would then be used by the labelers to labels all the data (e.g., 10-12 thousand utterances). The labeled data would then be stored in annotated data database 1170. After, the manual labeling process is complete, the full set of labeled utterances can then be used to build the final NLU model. In one embodiment, this process can also be controlled by Web application 1140.

Figure 11:
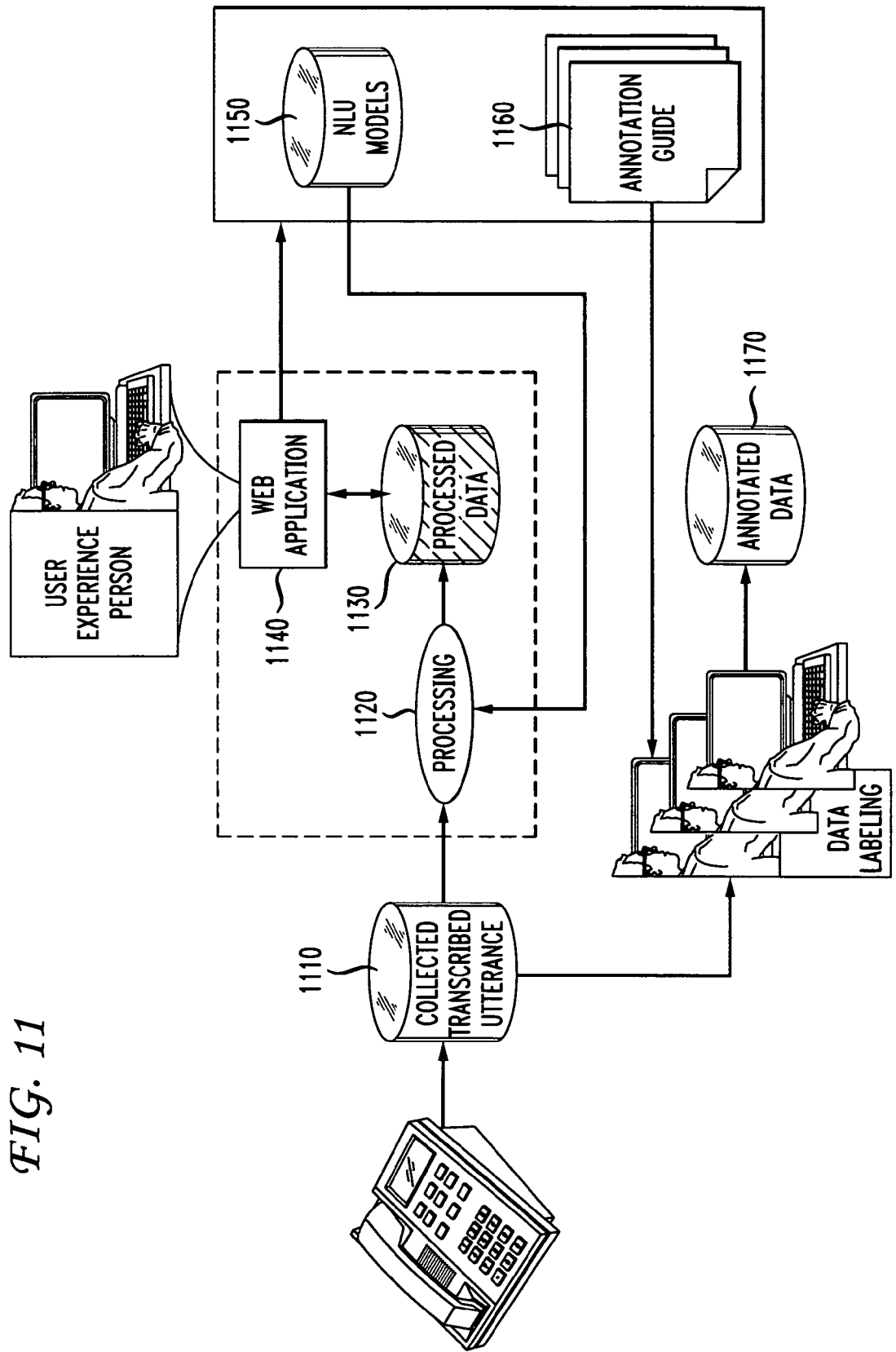
FIG. 11 illustrates an embodiment of a process for generating an annotation guide and natural language understanding model.

As illustrated in FIG. 11, NLU models 1150 can also be used in processing 1120. For any transcribed but unlabeled data, those utterances that are most likely in existing call types can be identified. Processing 1120 would not only reduce data but would also classify the data using NLU models 1150.

For example, if the dialog application is in the retail sector and a good NLU model already exists for another application in the retail sector, then we can use that NLU model to identify the call types with high probabilities. Assume further that a good NLU library has been generated to capture most of the call types found in various retail applications. Unlabeled data can then be processed with the resulting call types being provided to the user experience person even before the user experience person has started labeling call types. The user experience person can then review the results and make appropriate changes, thereby labeling utterances more quickly. In effect, this accelerates the user experience labeling process.

In another example, the user experience person can label an initial set of utterances (e.g., 1-2 thousand), and then build an initial NLU model. To save time labeling the next set of utterances (e.g., 1-2 thousand), the user experience person can classify the second set of utterances using the NLU model built from the first set. If roughly 75% of the utterances in the second set have high probabilities, then this means that the user experience person did not have to label a large number of utterances. The data can be merged and fine tuned using Web application 1140 for editing utterances and call types. Also, the NLU modules can be used to fine tune this merged data set and to test that the NLU model is working properly. At this point, the user experience person could finalize the annotation guide 1160. Also, the user experience person could generate another NLU model 1150 that can be used for development to test call routing and call flows.

Having described the general process of creating NLU models 1150 and annotation guide 1160, a description of the functions supported by NLU module 330 is now provided. These functions are designed to operate in conjunction with results generated by annotation module 310.

The building of the NLU model is supported by build model module 332. In general, build model module 332 uses utterance and call type labels included in processed data database 1130. As noted, the build model module 332 could create an NLU model using the set of positive samples.

In one embodiment, a set of test and training utterances are generated from the utterance data in processed data database 1130. In this process, a simple algorithm can be used. If there are less than say, five utterances for a call type, then those utterances are only used for training, otherwise, 20% of the utterance data is used for test and 80% of the utterance data is used for training. The test and training utterances are then proportionally expanded to include the clones. Alternatively, the utterances can first be expanded to include the clones and then split into training and test utterances.

In one embodiment, both the test and training utterances are placed in a separate set of lsn and calltype files, wherein the lsn file is a text file that contains all the utterances, one utterance per line (e.g., the first line might have the text "store hours") and the calltype file is a text file where each line contains all the call types for each utterance (separated by spaces) with each line in the same order as the lines in the corresponding lsn file. For example, if the "store hours" utterance is the first one in the lsn file, then the first line in the corresponding calltype file would contain all the call types (e.g., Request(Store_Hours)) where this utterance occurred.

Once the lsn and calltype files are made available for the training utterances, the initial NLU model can then be built. In one embodiment, this process is not meant for interactive use since it can take up a significant amount of time (e.g., 30 minutes for 5000 utterances) depending on the available processing speed.

Figure 8A:
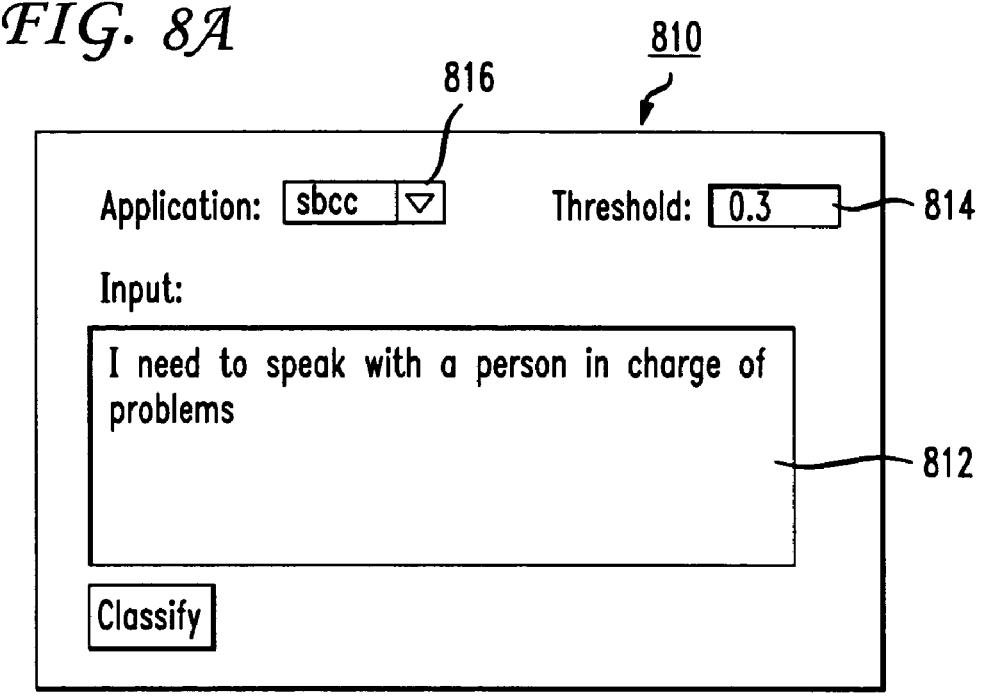
FIGS. 8A and 8B illustrate an embodiment of screenshots that illustrates the test utterance module operation.

After the NLU model is built, the NLU model can be tested. Here, test utterance module 334 can be used to enable the user to enter any adhoc test utterance and to test it on the NLU model. FIG. 8A illustrates an example of a user interface that can be used to test adhoc utterances on the NLU model. As illustrated, interface 810 includes input window 812 configured to receive the adhoc utterance from the user and threshold indicator 814 that enables the user to specify the threshold level below which call types results are not returned. Finally, interface 810 also includes application selection window 816 that enables the user to test the same utterance on other NLU models built for other applications (or all applications can be tested simultaneously).

Figure 8B:
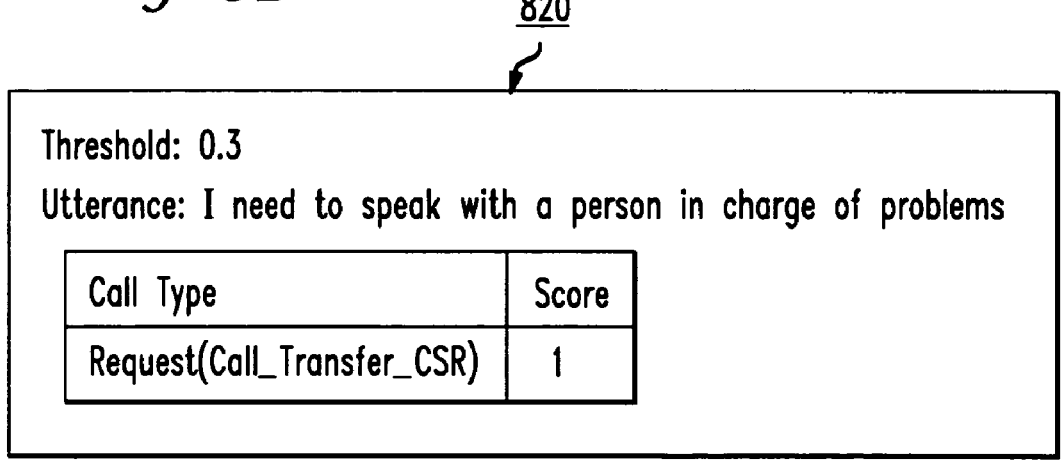

FIG. 8B illustrates an example of the results that are returned by test utterance module 334. As illustrated, results window 820 indicates the results of the particular test utterance specified in input window 812. In this case, the only call type with a score above the threshold of 0.3 is the call type Request(Call_Transfer_CSR) having a score of 1.0. If there were other call types that were above the threshold 0.3, then those additional call types would also appear in the results table of input window 812.

Select utterance module 335 alternatively enables the user to see the full list of test utterances and select various utterances for interactive testing. FIG. 9A illustrates an example of a user interface that can be used to select various utterances. As illustrated, selection window 910 includes utterance table 912, which further includes utterances from the test data. In one embodiment, each utterance can be a link to test utterance module 334 described above. Finally, in addition to some statistics at the top of selection window 910, utterance table 912 also indicates the ID number and whether or not the utterance is a clone.

If the user were to select the first utterance, the results would be as shown in FIG. 9B. As illustrated, results window 920 includes the same results as that in results window 820 but the ID number and True call types are also shown. Here, the True call type is the call type associated with this utterance as per processed data database 1130. In this case, the utterance was properly classified since the True call type is the same as the call type in results window 920.

In one embodiment, batch test module 336 has two primary functions. First, it converts scores into probabilities (Logistic Regression). Second, it processes the results and provides feedback to the user.

The results returned by the batch test module 336 are shown in FIG. 10A. There are three links 1012, 1014, and 1016. Link 1012 provides detailed results in a simple table as well as the summary results. The other two links 1014 and 1016 show you the same data but includes all the confidence scores (how each utterance is classified with respect to every single call type). In particular, link 1014 shows the confidence scores for each call type for all the test utterances. Link 1016, on the other hand, shows the probabilities for each call type for all the test utterances. It should be noted that this information can be generated when the NLU model is built.

FIGS. 10B and 10C show the detailed and summary results, respectively. The detailed results let the user see if the utterance was misclassified or not. For each test utterance, the user can see the true call type in the Truth column. These true call types were selected when the utterances for the annotation guide were being identified. In one embodiment, if the call type is in bold, then it is the call type with the highest probability and the probability is shown in brackets. If the utterance is shown in a designated color, then the utterance is a multi-class utterance and the Truth column will show all the call types in which this utterance occurs. If the utterance is not classified correctly, then the bold entry in the either of the last two columns would be the misclassified call type. The Above Threshold column contains the call types with probability larger than the threshold (set to 0.3 in this example). The Below Threshold column contains up to three call types below the threshold. In the example of FIG. 10B, the most interesting result below is for utterance 177, which indicates that two different call types gave practically the same probability (Report(TroublePlacingCCCall) and Request(PIN)). Clearly, more work needs to be done here in order to differentiate these two call types since it does not appear that the caller is requesting a PIN.

The Summary results are shown in FIG. 10C. Here, for each utterance (only single class utterances), the overall score in the Summary results is a classification metric for each class which is a measure of differentiability. In one embodiment, the score is calculated as follows and it is averaged over the utterances.

1. If the call type is the truth, the score is the difference (positive) between the truth probability and the next highest probability
2. If the call type is not the truth, the score is the difference (negative) between the truth probability and the highest probability In another embodiment, the score can be generalized for multi-class utterances as follows and would be averaged over the utterances.

1. If one of the call types is the truth, the score is the difference (positive) between the highest truth probability and the next highest non-truth probability
2. If another call type has a higher score than all the truth call types, the score is the difference (negative) between the highest truth probability and the highest probability In the example of FIG. 10C, the results for these call types are quite good. The overall score is quite high except for the Request(Info_Rates) call type that has a score of only 0.420. If the overall score is 1.0, then this means that the utterance is always properly classified. If the overall score is −1.0, then it means that the utterance is never properly classified.

Finally, export model module 338 supports the rare case where someone else will manually build the NLU model from the utterance data. In this scenario, the user can export the model files (lsn and calltype) using export model module 338. The user could then use the exported files to build the NLU model offline.

As thus described, NLU module 330 can be used to generate an initial usable NLU model rapidly. The testing features of NLU module 330 also enable the user to check the accuracy of the NLU model before it is released for field testing. If the initial build of the NLU model is unsatisfactory, the user can also proceed to modify the utterance classification data using annotation module 310. An interactive process using annotation module 310 and NLU module 330 therefore results, which enables the rapid production of a dialog application.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or a combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents only should define the invention, rather than any specific examples given.

What is claimed is:

1. A method for generating a natural language understanding model, comprising:
   a. collecting a plurality of unlabeled utterances;
   b. generating via a processor a plurality of call types for a first natural language understanding model based on call types with high probabilities in an existing natural language understanding model for a different application, each generated call type being based on a first set of utterances selected from the plurality of unlabeled utterances;
   c. generating the first natural language understanding model using call type information contained within the first set of utterances;
   d. testing the first natural language understanding model;
   e. modifying the plurality of call types based on the testing; and
   f. generating a second natural language understanding model using the modified plurality of call types.

2. The method of claim 1, further comprising generating an annotation guide using a second set of utterances which is a subset of the first set of utterances.

3. The method of claim 1, further comprising generating call type data using at least one of data clustering, relevance feedback, string searching, data mining, and active learning tools.

4. The method of claim 3, wherein the call type data is generated using a graphical user interface.

5. The method of claim 1, wherein the first natural language understanding model is trained using a first text file containing utterances contained within the first set of utterances and a second text file containing call types assigned to the utterances in the first text file.

6. The method of claim 1, wherein the natural language understanding model is tested using a subset of the first set of utterances.

7. The method of claim 1, wherein the plurality of call types are modified using a graphical user interface.

8. The method of claim 1, wherein the first natural language understanding model is created prior to an annotation guide.

9. A method for generating a natural language understanding model, comprising:
   collecting a plurality of unlabeled utterances;
   generating via a processor a plurality of call types for a natural language understanding model based on call types with high probabilities in an existing natural language understanding model for a different application, each of the plurality of call types having utterances selected from the plurality of unlabeled utterances, the utterances used to generate the plurality of call types representing a subset of the collection of utterances; and
   generating the natural language understanding model using call type information contained within the subset of utterances, wherein the natural language understanding model is generated prior to receipt of manually labeled utterance data.

10. The method of claim 9, wherein the manually labeled utterance data is generated using an annotation guide that is created using a portion of the subset of utterances.

11. The method of claim 9, wherein the natural language understanding model is generated using a first text file containing utterances contained within the subset of utterances and a second text file containing call types assigned to the utterances in the first text file.

12. The method of claim 9, wherein the natural language understanding model is tested using a second subset of the collection of utterances.

* * * * *